Figure 3:
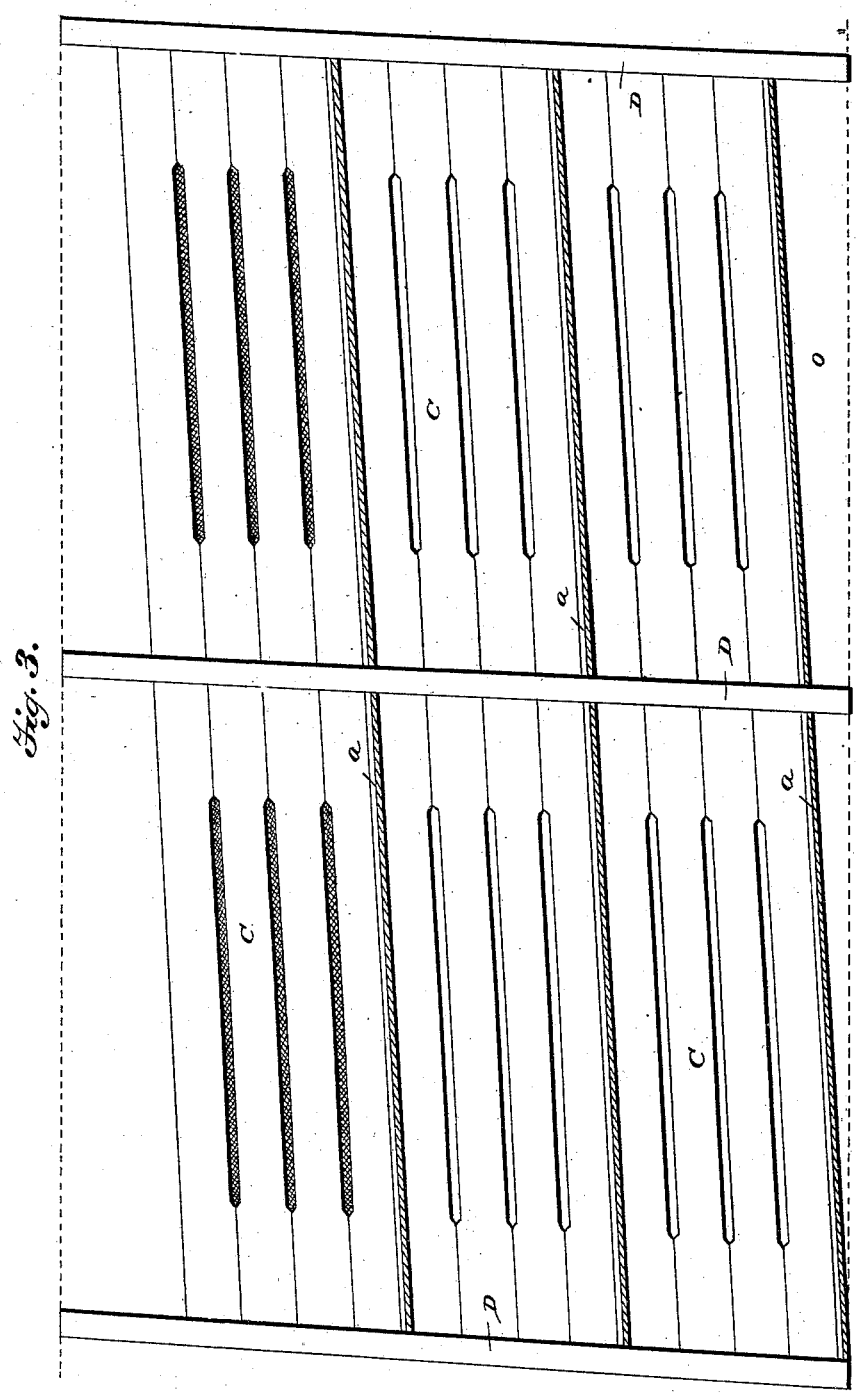

(No Model.) 3 Sheets—Sheet 1.
R. D. COULTER.
FRUIT CAR.
No. 422,920. Patented Mar. 11, 1890.
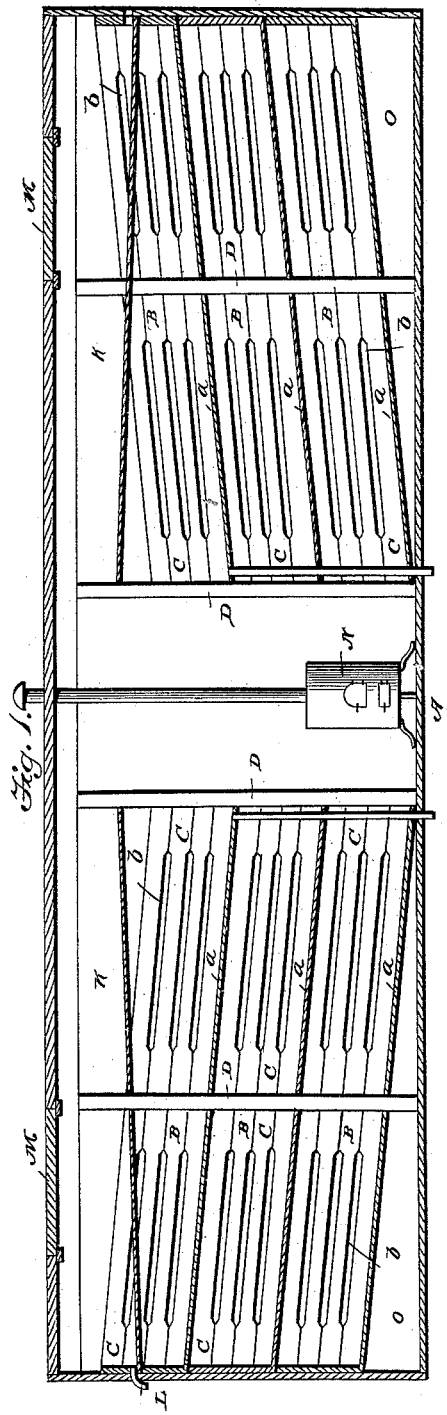
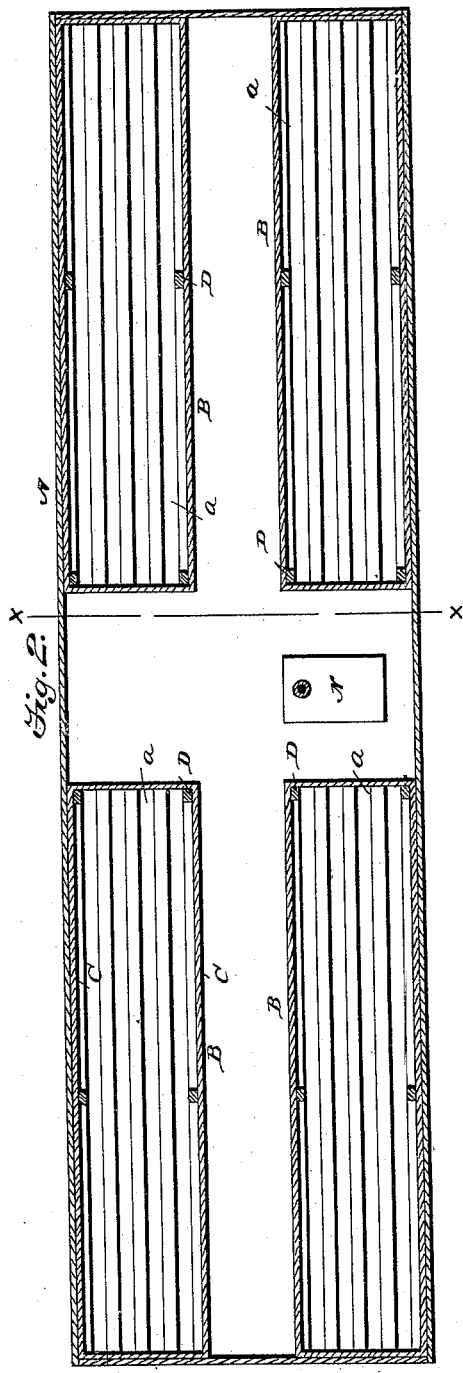
Witnesses
Inventor
R. D. Coulter.
By James Sheehy
Attorney (No Model.) 3 Sheets—Sheet 2.

R. D. COULTER.
FRUIT CAR.

No. 422,920. Patented Mar. 11, 1890.

Witnesses

Inventor
R. D. Coulter
By James J. Sheehy
Attorney

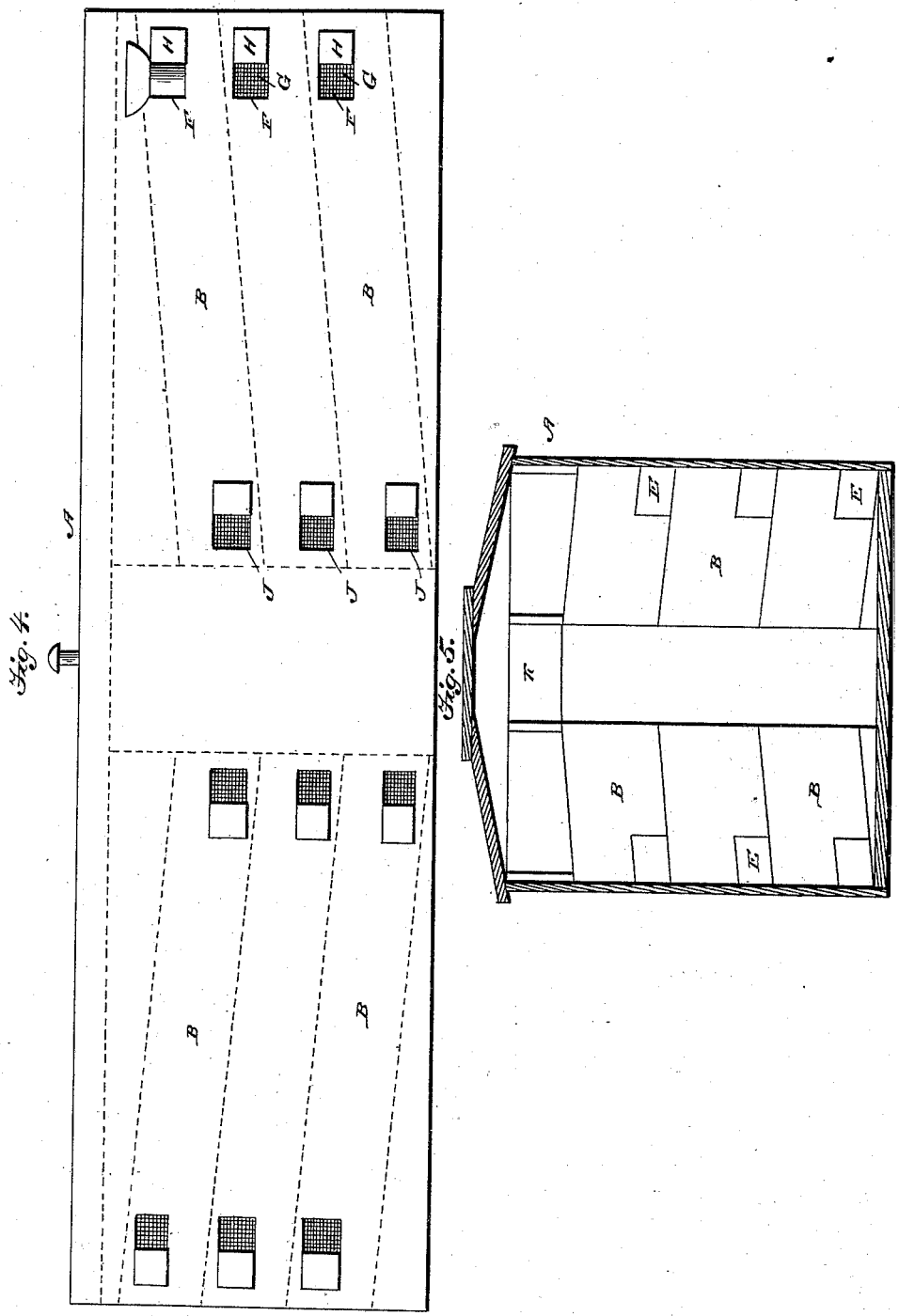

UNITED STATES PATENT OFFICE.

RICHARD DOUGLASS COULTER, OF ORANGE CITY, FLORIDA.

FRUIT-CAR.

SPECIFICATION forming part of Letters Patent No. 422,920, dated March 11, 1890.

Application filed February 1, 1890. Serial No. 338,906. (No model.)

*To all whom it may concern:*

Be it known that I, RICHARD DOUGLASS COULTER, a citizen of the United States, residing at Orange City, in the county of Volusia and State of Florida, have invented certain new and useful Improvements in Fruit-Cars; and I do declare the following to be a full, clear, and exact description of the invention, such as will enable others skilled in the art to which it appertains to make and use the same.

This invention relates to improvements in freight-cars of that description employed in the transportation of perishable fruit and vegetables, and it has for its purpose among other objects to provide means whereby the fruit in bulk can be readily loaded and unloaded and thoroughly ventilated and preserved during transportation.

The improvements consist in the construction, novel combination, adaptation, and arrangement of parts hereinafter described and claimed, and illustrated in the accompanying drawings, in which—

Figure 1 is a vertical longitudinal central sectional view of my improved car for the transportation of perishable fruit and the like. Fig. 2 is a horizontal sectional view of the same. Fig. 3 is a detail side elevation of one of the bins or sections. Fig. 4 is a side elevation of the improved car, and Fig. 5 is a transverse vertical sectional view of the same, taken on the line $x$ $x$ of Fig. 2.

In carrying out my invention I employ a series of bins or sections of a construction capable of easy loading and unloading, and provided with means for readily ventilating the same. I also in some instances provide means for artificially heating and cooling the cargo; but it is obvious that these mediums may be dispensed with when climatic conditions no longer warrant their employ.

Referring to the drawings by letter, A indicates a freight-car, which may be of any ordinary or approved construction, the common box-car, for purposes of economy, being preferable.

Within the car at either side of lateral and longitudinal passages I arrange bins or sections B for the reception of the fruit to be transported. These bins or sections B, of which there may be any number, according to the size desired, are designed to be constructed one above another in tiers, as better shown in Fig. 1, and they are provided, for the purpose of facilitating the loading, distribution, and unloading of the fruit, with floors $a$, which are inclined longitudinally from the respective ends of the car toward the center thereof, and which slope laterally from the longitudinal passage to the sides of the car, as better illustrated in Fig. 5.

The outer side and end walls of the bins are formed by the sides and ends of the car, and their inner side walls are formed of planks or strips C, which are seated in slots or recesses cut in standards D and the end walls or corner-posts of the car; but where it is necessary I employ auxiliary end and side walls for the bins adjacent to the sides and ends of car. The planks or strips C, which are capable of ready placement and removal, are provided with corresponding openings or slots $b$ in their meeting edges to provide ventilation for the fruit or other freight, and where desired the said slots or openings may be filled in by wire-gauze, and by reason of the ready placement and removal the bin may be easily built to any height required; but when desired the side and end walls respectively of the bins may be permanently formed, and the use of the removable slats or boards dispensed with.

It is obvious that when desired the bins or sections may be provided with lateral partitions or walls capable of easy placement and removal. The inner end walls of the respective bins or sections are provided with hinged or sliding doors E for the discharge or unloading of the fruit, a chute or conveyer being attached to said opening by hooks or similar appliances, and the fruit discharged thereby into a vessel or other receptacle.

F indicates the ventilating and loading openings of the car. These openings, of which there are a number corresponding to the number of bins or sections, are cut in the side wall of the car at a point adjacent to the top of the respective bins, and they are provided, respectively, with two sliding doors, of gauze-wire and wood or other similar material, respectively.

G indicates the gauze-wire door, which is designed to ventilate the car without danger of the fruit being stolen or removed, and H indicates the outer wooden storm-door, which is designed for use in cold and inclement weather.

When the car is formed without the central longitudinal and transverse aisles, I cut openings J in the side walls of the car at the lowest point of the respective bins for the discharge or unloading of the cargo. These lower or discharge openings, of which there are a number corresponding to the number of bins, have screen and storm doors of a similar construction to those of the loading-openings, and are also provided with hooks or other suitable means of attachment for a chute or conveyer to facilitate the unloading or transfer of the fruit to another receptacle or carrier.

When the car is loaded from the outside, I design using a funnel-shaped conveyer, which is introduced and temporarily secured in the openings F, the fruit or other freight being loaded at that point.

It is obvious that when the longitudinal and transverse aisles are employed the openings F J in the sides of the car might be dispensed with and the freight loaded from inside of car through doors in the bins; but ordinarily the loading and unloading of the car from the outside is desirable, and I therefore prefer the use of the same.

K indicates the ice or refrigerating chambers of the car, which are brought into use when the heat is such as to damage the fruit or vegetables. These chambers K, which are of a width similar to that of the longitudinal aisle, may be of any size desired consistent with the size of the car, and they are provided with water-tight floors and sides to prevent dripping upon the cargo. The floors or bottoms of the respective ice-chambers are inclined from the center or transverse aisle of the car to the ends thereof, the direction of their inclination being opposite to that of the floors of the bins or sections.

L indicates two drainage-spouts for carrying off drip from the ice-chambers.

M indicates trap-doors in the top of car over ice-chambers, to allow of the introduction of ice thereto, and I also provide doors in the end of ice-chambers at the transverse aisle, and the ice is loaded at that point also.

N indicates a stove, which may be of any ordinary or approved construction, and which is preferably placed in the transverse aisle of the car. This stove N is designed for use only when the temperature of the car is such as to damage the fruit.

O indicates air spaces or chambers, which are afforded by the inclination of the bottom floor of the lower bins or sections. These chambers O, the object of which is to further the ventilation of the respective bins, are provided with slotted inner side walls for the admission of air, which then passes up through the slotted bottom of the bins and filters through the fruit, thereby preventing and arresting decay or spoiling of the same.

By the construction illustrated it will be seen that I have provided a car capable of being readily loaded and unloaded with fruit in the bulk and adapted by the peculiar construction and arrangement of the various parts to transport the same in a good condition.

It is obvious that when preferable the transverse and longitudinal aisles may be dispensed with and the bins built the full width of car, in which instance the openings in side of car will afford induction and outlet openings for the freight. It is also obvious that when desired the bins may be removed at the end of the journey after the freight has been discharged and the lumber employed in their construction packed in a small space and returned for a new load.

Where the nature of the fruit is such as to warrant such a measure, I pad the bottom and side walls of the bin with canvas, grass, or any suitable material to lessen the liability of bruising the fruit.

Having described my invention, what I claim is—

1. The combination, with a railway freight-car or similar conveyance, of a bin or section arranged therein and having a longitudinally and laterally inclined floor or bottom and openings for loading and unloading the same, substantially as specified.

2. The combination, with a railway freight-car or other similar conveyance, of a series of bins or sections arranged therein so as to form central longitudinal and cross aisles, the said bins being provided with longitudinally and laterally inclined bottoms, and means for the introduction and discharge of fruit and the like, substantially as specified.

3. The combination, with a freight-car or similar conveyance, of a series of bins arranged therein, having longitudinally and laterally inclined bottom walls pitched from the end of car to the center thereof and from the longitudinal center to the sides, respectively, substantially as specified.

4. In a railway freight-car, substantially as described, the combination, with the bins or sections arranged therein, having bottoms inclined both longitudinally and laterally, of the loading and unloading doors or openings arranged with respect to the bins, substantially as specified.

In testimony whereof I affix my signature in presence of two witnesses.

RICHARD DOUGLASS COULTER.

Witnesses:
C. J. CRENSHAW,
J. STANLEY NAGLE.